(12) United States Patent
Higgins et al.

(10) Patent No.: US 11,463,317 B2
(45) Date of Patent: *Oct. 4, 2022

(54) REFERENT SYSTEM FOR DEVICES OF AN NFV NETWORK

(71) Applicant: AT&T Intellectual Property I, L.P., Atlanta, GA (US)

(72) Inventors: Robert M. Higgins, Manasquan, NJ (US); Mark Jeffrey Foladare, East Brunswick, NJ (US); Dean Bragg, Toms River, NJ (US); John Ng, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,316

(22) Filed: Nov. 4, 2020

(65) Prior Publication Data
US 2021/0075685 A1 Mar. 11, 2021

Related U.S. Application Data

(63) Continuation of application No. 16/662,349, filed on Oct. 24, 2019, now Pat. No. 10,862,763, which is a (Continued)

(51) Int. Cl.
*H04L 41/12* (2022.01)
*G06F 9/455* (2018.01)
(Continued)

(52) U.S. Cl.
CPC .......... *H04L 41/12* (2013.01); *G06F 9/45558* (2013.01); *G06F 9/5077* (2013.01);
(Continued)

(58) Field of Classification Search
CPC . H04L 41/12; H04L 41/0816; H04L 43/0817; H04L 67/18; H04L 41/0897; H04L 41/122; H04L 41/40; H04L 43/20; H04L 67/52; G06F 9/45558; G06F 9/5077; G06F 2009/45591
See application file for complete search history.

(56) References Cited

U.S. PATENT DOCUMENTS 6,131,119 A 10/2000 Fukui
7,543,045 B1 6/2009 Agrawal et al.
(Continued)

OTHER PUBLICATIONS

Non-Final Office Action received for U.S. Appl. No. 14/737,867, dated Feb. 2, 2017, 41 pages.
(Continued)

*Primary Examiner* — Arvin Eskandarnia
*Assistant Examiner* — Chhian (Amy) Ling
(74) *Attorney, Agent, or Firm* — Amin, Turocy & Watson, LLP

(57) ABSTRACT

A network functions virtualization (NFV) network can be configured to operate according to NFV protocols that decouple software functionality from specific hardware elements. A referent system can be provided that identifies a precise physical location of devices associated with the NFV network relative to other equipment or devices associated with the NFV network.

20 Claims, 8 Drawing Sheets

Related U.S. Application Data continuation of application No. 15/859,941, filed on Jan. 2, 2018, now Pat. No. 10,491,484, which is a continuation of application No. 14/737,867, filed on Jun. 12, 2015, now Pat. No. 9,887,882.

(51) Int. Cl.

| | | |
|---|---|---|
| *G06F 9/50* | (2006.01) | |
| *H04L 41/0816* | (2022.01) | |
| *H04L 43/0817* | (2022.01) | |
| *H04L 67/52* | (2022.01) | |
| *H04L 41/122* | (2022.01) | |
| *H04L 41/0897* | (2022.01) | |
| *H04L 43/20* | (2022.01) | |
| *H04L 41/40* | (2022.01) | |

(52) U.S. Cl.
CPC ...... *H04L 41/0816* (2013.01); *H04L 41/0897* (2022.05); *H04L 41/122* (2022.05); *H04L 41/40* (2022.05); *H04L 43/0817* (2013.01); *H04L 43/20* (2022.05); *H04L 67/52* (2022.05); *G06F 2009/45591* (2013.01)

(56) References Cited

U.S. PATENT DOCUMENTS

| | | |
|---|---|---|
| 7,639,138 B2 | 12/2009 | Chang |
| 7,648,070 B2 | 1/2010 | Droms et al. |
| 7,706,369 B2 | 4/2010 | Roese et al. |
| 7,792,943 B2 | 9/2010 | Chainer et al. |
| 8,499,067 B2 | 7/2013 | Joukov |
| 8,543,681 B2 | 9/2013 | Bearden et al. |
| 8,671,294 B2 | 3/2014 | Malik et al. |
| 8,706,879 B2 | 4/2014 | Sparks |
| 8,737,168 B2 | 5/2014 | Somasundaram et al. |
| 8,738,791 B1 | 5/2014 | Martini |
| 8,775,584 B2 | 7/2014 | Tabbara |
| 8,868,738 B2 | 10/2014 | Pagan et al. |
| 8,880,907 B2 | 11/2014 | Ives et al. |
| 8,886,985 B2 | 11/2014 | Somasundaram et al. |
| 8,954,445 B2 | 2/2015 | Morphis et al. |
| 8,990,386 B2 | 3/2015 | He et al. |
| 8,996,687 B2 | 3/2015 | Zadig |
| 9,466,045 B1 | 10/2016 | Kumar |
| 2005/0071417 A1 | 3/2005 | Taylor et al. |
| 2005/0253722 A1 | 11/2005 | Droms et al. |
| 2008/0101277 A1 | 5/2008 | Taylor et al. |
| 2008/0214140 A1* | 9/2008 | Caveney ............ H04L 41/0803 455/402 |
| 2008/0298302 A1 | 12/2008 | Ishida |
| 2009/0024764 A1 | 1/2009 | Atherton et al. |
| 2010/0199276 A1 | 8/2010 | Umbehocker |
| 2011/0047263 A1 | 2/2011 | Martins et al. |
| 2011/0176541 A1* | 7/2011 | James ................ H04L 65/1069 370/352 |
| 2011/0207429 A1 | 8/2011 | Maier et al. |
| 2011/0255611 A1 | 10/2011 | Caveney et al. |
| 2012/0166693 A1 | 6/2012 | Weinstock et al. |
| 2012/0185413 A1 | 7/2012 | Felter |
| 2012/0320795 A1* | 12/2012 | Shukla .................... H04L 41/12 370/254 |
| 2013/0091255 A1 | 4/2013 | Jai |
| 2013/0151730 A1 | 6/2013 | Roscoe et al. |
| 2013/0182590 A1* | 7/2013 | Soulie .................. H04W 84/18 370/255 |
| 2013/0227097 A1 | 8/2013 | Yasuda et al. |
| 2014/0057666 A1 | 2/2014 | Dec et al. |
| 2014/0109191 A1 | 4/2014 | Raghuram |
| 2014/0164624 A1 | 6/2014 | Ames et al. |
| 2014/0201374 A1 | 7/2014 | Ashwood-Smith et al. |
| 2015/0012657 A1 | 1/2015 | Botti et al. |
| 2015/0140954 A1* | 5/2015 | Maier .................. H04W 4/025 455/404.2 |
| 2015/0378760 A1* | 12/2015 | Su ....................... G06F 9/45558 718/1 |
| 2016/0006696 A1 | 1/2016 | Donley et al. |
| 2016/0308715 A1 | 10/2016 | Rasanen |
| 2016/0352578 A1 | 12/2016 | Chen et al. |
| 2017/0142024 A1* | 5/2017 | Fromentoux ........... H04L 67/16 |

OTHER PUBLICATIONS

Final Office Action received for U.S. Appl. No. 14/737,867, dated May 22, 2017, 36 pages.
Zheng, et al. "Spotlight: the rise of the smart phone." Distributed systems online, IEEE 7.3 (2006).http://ieeexplore.ieee.org/stamp/stamp.jsp?tp=&arnumber=1621016 (p. 9).
Eskandari, et al.,"VLOC: An Approach to Verify the Physical Location of a Virtual Machine in Cloud."Cloud Computing Technology and Science (CloudCom), 2014 IEEE 6th International Conference on. IEEE, 2014 9 pages.
Wickremasinghe, et al."Cloud analyst: A cloud sim-based visual modeller for analysing cloud computing environments and applications." Advanced Information Networking and Applications (AINA), 2010 24th IEEE International Conference on. IEEE, 2010, 7 pages.
Berger, et al. "Security for the cloud infrastructure: Trusted virtual data center implementation." IBM Journal of Research and Development vol. 53 No. 4 Paper 6 2009, 12 pages.
Koslovski, et al. "Reliability support in virtual infrastructures." Cloud Computing Technology and Science (CloudCom), 2010 IEEE Second International Conference on. IEEE, 2010, 10 pages.
International Search Report and Written Opinion dated Jul. 18, 2016 for PCT Application Serial No. PCT/US2016/028713, 11 pages.
Non-Final Office Action received for U.S. Appl. No. 15/859,941 dated Oct. 12, 2018, 43 pages.
Final Office Action received for U.S. Appl. No. 15/859,941 dated Feb. 12, 2019, 25 pages.
Notice of Allowance received for U.S. Appl. No. 15/859,941 dated Jul. 25, 2019, 29 pages.
Notice of Allowance received for U.S. Appl. No. 16/662,349 dated Aug. 7, 2020, 43 pages.

* cited by examiner

EXAMPLE REFERENT IDENTIFIER DATA 106

EXAMPLE DEVICE DATA 110

EXAMPLE REFERENCE DATA 112

| Location | Age | Boy | Shelf | Device | Function VNF-function-at-time a,t (a t, infinity) |
|---|---|---|---|---|---|
| UNY3111 | 1 | 1 | 1 | 1 | VNF(a,t) |
| UNY3111 | 1 | 1 | 1 | 2 | VNF(a,t) |
| UNY3113 | 1 | 1 | 1 | 3 | VNF(a,t) |
| UNY3121 | 1 | 1 | 2 | 1 | VNF(a,t) |
| UNY3122 | 1 | 1 | 2 | 2 | VNF(a,t) |
| UNY3211 | 1 | 2 | 1 | 1 | VNF(a,t) |
| UNY3212 | 1 | 2 | 1 | 2 | VNF(a,t) |
| UNY3223 | 1 | 2 | 1 | 3 | VNF(a,t) |
| UNY3221 | 1 | 2 | 2 | 1 | VNF(a,t) |
| UNY3122 | 1 | 2 | 2 | 2 | VNF(a,t) |
| UNY3223 | 1 | 2 | 2 | 3 | VNF(a,t) |
| UNY3211 | 2 | 1 | 1 | 1 | VNF(a,t) |

402a — CAN BE A NON-UNIQUE IDENTIFIER WITHIN THE REFERENT SYSTEM

402b

404 — CAN BE A NON-UNIQUE IDENTIFIER WITHIN THE REFERENT SYSTEM

406 — COMBINATION OF 112 AND 110 CAN BE A UNIQUE IDENTIFIER WITHIN THE REFERENT SYSTEM

FIG. 4

REFERENT SYSTEM FOR DEVICES OF AN NFV NETWORK

RELATED APPLICATIONS

The present application is a continuation of, and claims priority to each of: U.S. patent application Ser. No. 16/662,349 (now U.S. Pat. No. 10,862,763), filed Oct. 24, 2019, and entitled "A REFERENT SYSTEM FOR DEVICES OF AN NFV NETWORK," which is a continuation of U.S. patent application Ser. No. 15/859,941 (now U.S. Pat. No. 10,491,484), filed Jan. 2, 2018, and entitled "A REFERENT SYSTEM FOR DEVICES OF AN NFV NETWORK," which is a continuation of U.S. patent application Ser. No. 14/737,867 (now U.S. Pat. No. 9,887,882), filed Jun. 12, 2015, and entitled "A REFERENT SYSTEM FOR DEVICES OF AN NFV NETWORK". The entireties of these applications are hereby incorporated by reference herein.

TECHNICAL FIELD

The present application relates generally to associating a network functions virtualization (NFV) function created in a virtual environment with a referent system that identifies a precise physical location of the device that is executing the NFV function and/or providing the virtual environment.

BACKGROUND

In the domain of network architecture, there is an ongoing research trend, both in industry and academia, directed toward exploring the possibility of implementing software-defined networking (SDN) and network functions virtualization (NFV) for at least a portion of a network. Primary motivations for such a transition are a reduction of the custom hardware costs and performance enhancements.

BRIEF DESCRIPTION OF THE DRAWINGS

Numerous aspects, embodiments, objects and advantages of the present embodiments will be apparent upon consideration of the following detailed description, taken in conjunction with the accompanying drawings, in which like reference characters refer to like parts throughout, and in which:

FIG. 4 illustrates a table that depicts various examples of the referent identifier data in accordance with certain embodiments of this disclosure;

DETAILED DESCRIPTION

Overview

Figure 1:
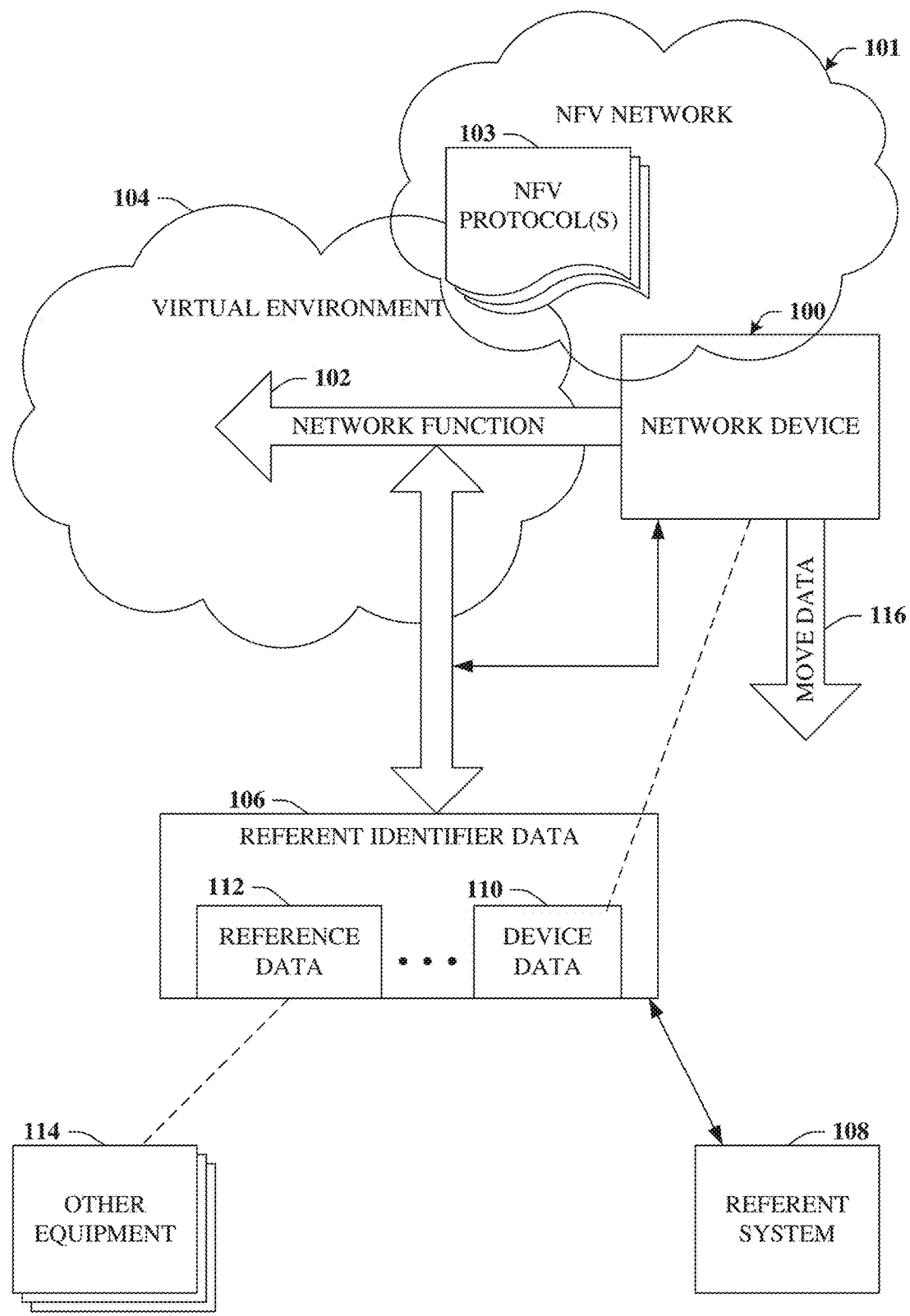
FIG. 1 illustrates a block diagram of an example system that can provide for a referent system indicative of a geographical or physical location of devices associated with an NFV Network in accordance with certain embodiments of this disclosure.

Network functions virtualization (NFV) can be employed to virtualize components (e.g., nodes, switches, interfaces, etc.) of a network, wherein virtual machines located in a cloud or virtual environment can perform processing that was previously performed by custom hardware devices these virtualized components replace in an NFV architecture. These virtual machines can be readily instantiated or destroyed in the cloud with very little effort and represent a separation of hardware from software. In other words, NFV can be implemented in connection with cloud-based computing instead of requiring localized custom hardware to perform the same functions—hence, the network functions being executed are no longer tied to custom hardware.

As noted, there are advantages to implementing a network according to NFV architecture. For example, since NFV represents a separation between hardware and software, virtual environments can be constructed by servers or other devices that are physically located substantially anywhere in the world instead of being tied to a specific location, as is the case with previous network architectures. For instance, traditional hardware tasked with providing a service to network users was generally tied to a physical location associated with that service or a related network element. In contrast, this same service can be provided by leveraging a virtual environment that is constructed by devices that are not tied to any specific physical location. Moreover, the devices can be commodity-based servers rather than application-specific custom devices and hence less expensive to operate and maintain.

However, separating hardware from software in connection with network functions, which represents an advantage that is provided by NFV, also introduces challenges that are not present for many other types of networks. In this regard, generally due to the fact that NFV operates to separate hardware and software elements, identifying the location associated with a specific device represents a distinct challenge.

The disclosed subject matter relates to a referent system that can be utilized to identify a precise physical location of devices associated with NFV networks. Such can be advantageous for a number of reasons. For example, consider the case in which a network device of a traditional network fails. Typically, such was remedied by dispatching service personnel to repair or replace the failing network device, which often represented a significant expense and possibly interrupted service for a significant amount of time. Historically, however, due to the tight coupling between hardware and software elements of traditional networks, these service personnel generally knew which failing network device required service and knew the location of that device.

Now consider a similar example in which a network device that instantiates a network function in a virtual environment associated with an NFV network. Suppose an error of some type occurs and the network function does not execute as intended. One of the advantages of an NFV network is that the network function can be moved and/or re-instantiated and executed by other devices of the network, generally without any interruption to the service and at virtually no cost. However, if the error occurred due to hardware failure or the like, service personnel generally do not have a good idea which physical device is failing and needs service, largely because there is no tight coupling between hardware and software elements, as is the case for traditional networks.

A given building might have many floors, each with many aisles of computing devices that operate in connection with the network. Each of these aisles might have many device bays, and each of the device bays can have multiple shelves, and within each shelf, multiple devices that can execute the network function. Such can be a difficult undertaking to identify which device, from among potentially many thousands, requires service. Such a difficulty can be further compounded by the fact that many such buildings might exist, distributed at various locations throughout the world.

Another advantage provided by the disclosed referent system can relate to selecting devices at specific locations for instantiating network functions. Consider a network service that critically requires low latency between various interoperating network functions. As another example, consider a network service that has very stringent regulatory demands relating to that service or the underlying equipment. In these and other cases, the referent system can be used to select specific devices that are used to execute a particular network function. For example, devices in very close geographic proximity can be selected to execute interoperating network functions that have low latency constraints or devices at a very specific location can be specifically selected to execute network functions in order to accommodate regulatory or other constraints.

NFV Referent System Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, network device 100 is depicted. Network device 100 can provide for a referent system (e.g., referent system 108) indicative of a geographical or physical location of devices associated with an NFV Network 101. In some embodiments, the referent system can be associated with a network function so that a precise physical location of the device executing the network function can be determined. In some embodiments, the referent system can be leveraged to select a device to be used to execute a network function, for instance selecting a precise physical location that is to be the location of devices executing the network function. Generally, network device 100 can comprise a processor and a memory that stores executable instructions that, when executed by the processor, facilitate performance of operations. Said processor and memory, as well as other suitable computer or computing-based elements, can be used in connection with implementing one or more of the systems or components shown and described in connection with FIG. 1 and other figures disclosed herein.

Network device 100 can be configured to execute network function 102 according to one or more NFV protocol(s) 103. For example, NFV protocol(s) 103 can define rules relating to functions of a NFV network 101 being provided in virtual environment 104. In some embodiments, virtual environment 104 can be generated by network device 100 or by many network devices, including network device 100, associated with the NFV network.

In some embodiments, network device 100 can associate network function 102 with referent identifier data 106, which can be identifier data defined by referent system 108. Referent identifier data 106 can comprise device data 110 and reference data 112.

Device data 110 can specifically identify network device 100. Hence, device data 110 can be used to identify the device (e.g., network device 100) that is executing network function 102. Additionally or alternatively, device data 110 can be used to select a specific device (e.g., network device 100) to execute or instantiate network function 102. In some embodiments, device data 110 identifies network device 100 relative to other equipment 114 associated with the NFV Network 101, which provides certain advantages over other identification techniques such as utilizing media access control (MAC) address data or the like, as further detailed herein. As used herein, other equipment 114 is contemplated to include any suitable equipment related to the NFV network 101 other than network device 100, which can be identified relative to the other equipment 114.

Figure 2:
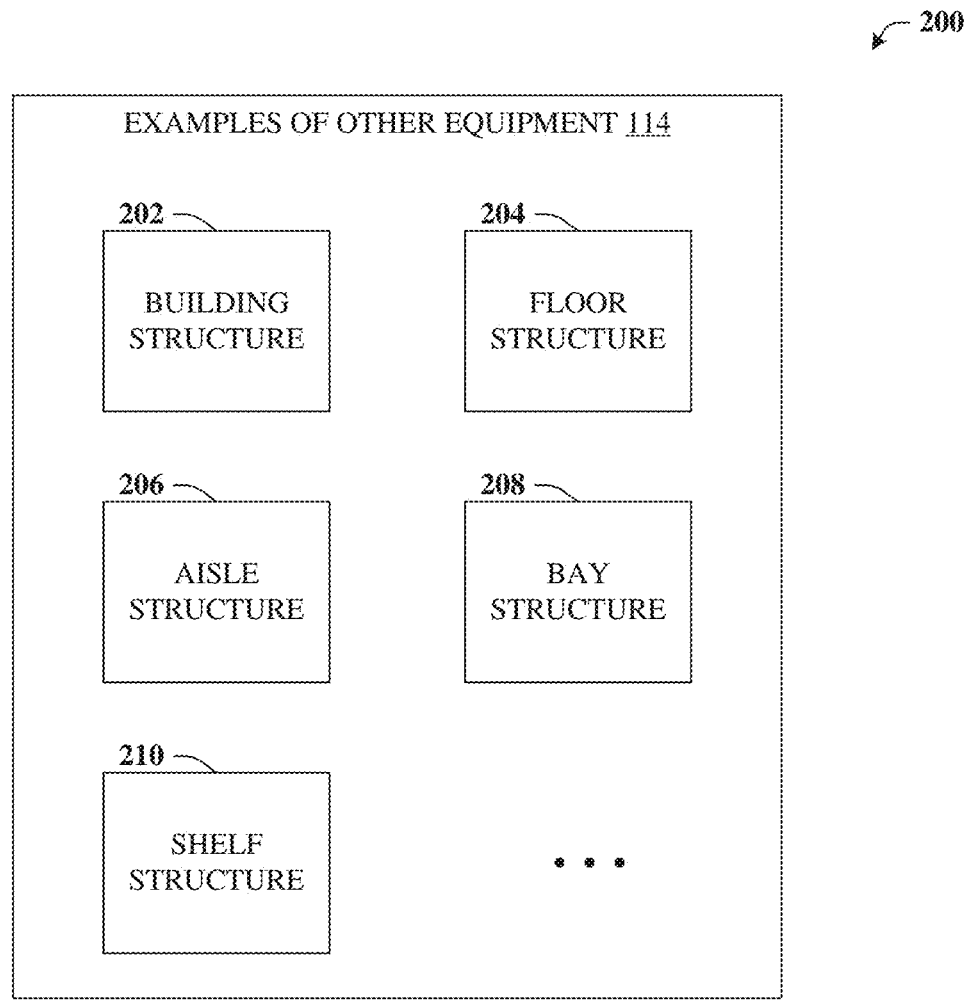
FIG. 2 provides an illustration that depicts various examples of the other equipment in accordance with certain embodiments of this disclosure.

Reference data 112 can represent data that identifies the other equipment 114. In some embodiments, referent identifier data 106 can indicate a physical location of network device 100 and the other equipment 114. FIG. 2 illustrates various examples of other equipment 114, FIG. 3 depicts an example of a hierarchical referent system 108 in connection with other equipment 114, and FIG. 4 depicts an example of referent identifier data 106 that is defined by referent system 108, all of which are intended to be referenced in conjunction with FIG. 1.

Turning now to FIG. 2, illustration 200 is provided. Illustration 200 depicts various examples of the other equipment 114. For instance, other equipment 114 can relate to building structure 202 or a floor structure 204. In those cases, the associated referent identifier data 106 can identify the particular building structure 202 as well as identify a specific floor of the building associated with floor structure 204 that generally includes devices associated with NFV network 101. Additionally or alternatively, other equipment 114 can comprise an aisle structure 206 that can comprise a group of devices associated with the NFV Network 101, a bay structure 208 that can comprise a group of devices associated with the NFV Network 101, a shelf structure 210 that can comprise a group of devices associated with the NFV Network 101, or any other suitable structure or device. It is understood that other equipment 114 can represent substantially any equipment associated with the NFV Network 101 or any structure or housing that comprises devices such as network device 100 that execute network functions of an NFV Network 101. Hence, the examples provided herein are referred to by convention, but other conventions or terminology is contemplated and, where suitable, is consistent with the disclosed referent system 108 and/or other disclosed subject matter.

Figure 3:
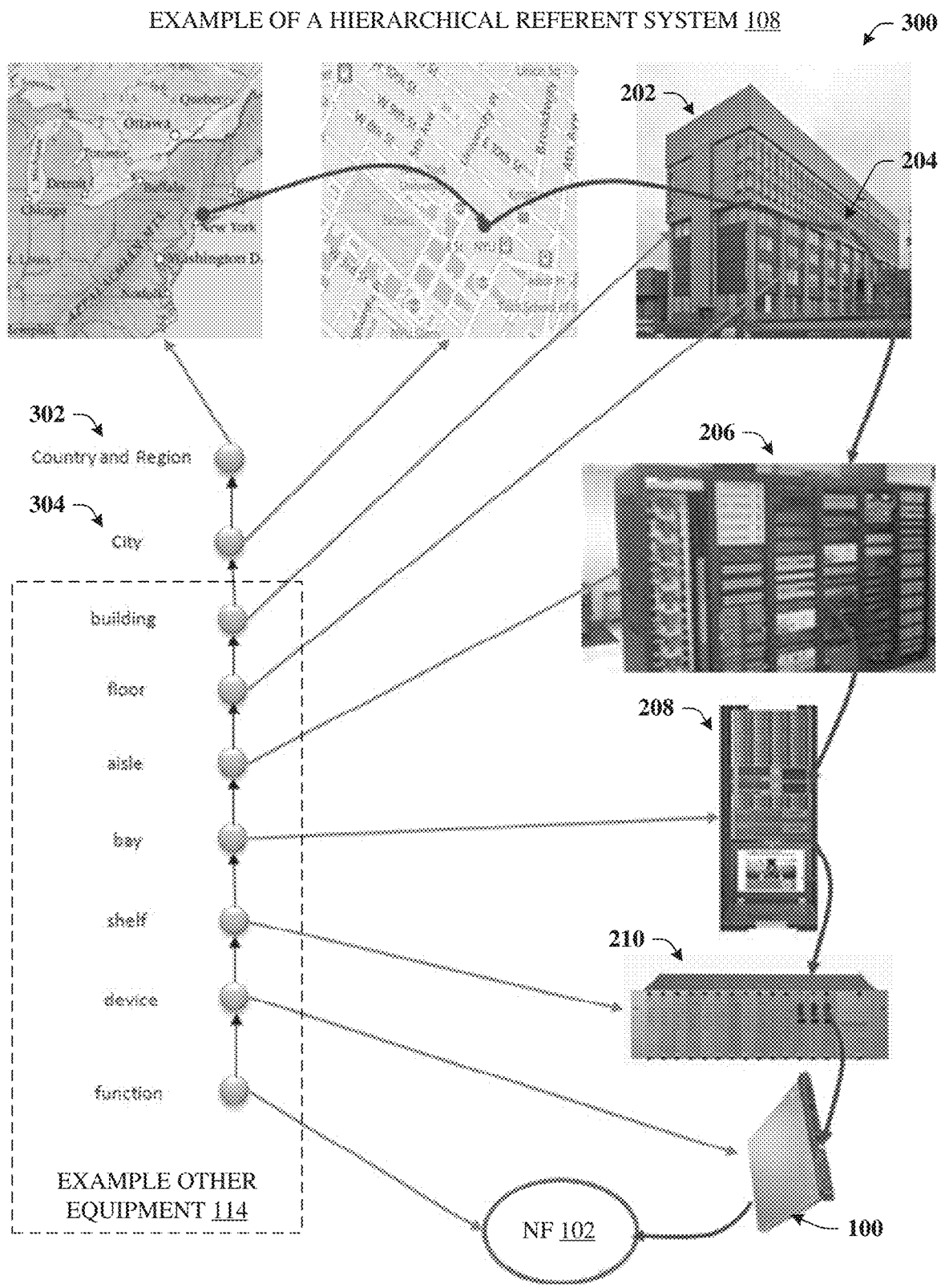
FIG. 3 illustrates a graphical depiction of an example referent system that hierarchically identifies the network device in relation to the other equipment specified by the referent system in accordance with certain embodiments of this disclosure.

FIG. 3 provides a graphical depiction 300 of an example referent system 108 that hierarchically identifies network device 100 in relation to the other equipment 114 specified by the referent system 108. At the upper hierarchical levels, a country or region 302 can be identified, as well as a city 304 within that country or region 302. Below these are the middle hierarchical levels, building structure 202 and floor structure 204. Hence, referent system 108 is contemplated to identify a particular floor of a particular building that is in a particular city of a particular country.

At the lowest hierarchical level in this example, is device 100 that executes network function 102. This device might be located within a specific shelf structure 210 that is in a specific bay structure 208, of a specific aisle structure 206 that is on the floor of the building indicated above.

It is understood that the upper hierarchical levels (e.g., 302, 304, etc.) and in some cases the middle levels associated with structures 202 and/or 204 can be identified by other referent systems and/or other location-based services such as global position satellite (GPS) or other trilateration or multi-lateration techniques. Hence, the disclosed subject matter can be used in combination with other referent systems, generally to identify the higher hierarchical tiers. It is appreciated, however, that the disclosed referent system 108 can describe a location of a specific device with much greater granularity than can be provided by other location-based services. One of the innovative aspects of the disclosed referent system 108 is that this precise location can be specified and/or identified relative to other equipment 114 associated with the NFV Network 101, which makes effective use of hierarchy such as that provided in graphical depiction 300.

With reference now to FIG. 4, illustration 400 is provided. Illustration 400 depicts various examples of the referent identifier data 106. As detailed previously, referent identifier data 106 can include reference data 112 that is indicative of other equipment 114 and device data 110 that identifies network device 100 relative to the other equipment 114.

In this example, reference data 112 includes four columns of data, indicated as "Location", "Aisle", "Bay", and "Shelf". It is assumed that data associated with the "Location" column sufficiently represents a location in the context of a specific country, region, city, building, floor, or other pertinent data. Such data can be provided by a different referent system (e.g., GPS) and transformed to the example referent system 108 depicted here. The subsequent columns, "Aisle", "Bay", and "Shelf" can expressly represent other equipment 114, and specifically elements 206, 208, and 210, respectively. It is understood that individual identifiers for these columns can, like device data 110, be an identifier that is relative to other (e.g., higher hierarchical tier) equipment 114.

In some embodiments, and due to the hierarchical nature of example referent system 108, device data 110 can be a non-unique identifier within referent system 108. Such is illustrated by boxes 402a and 402b, which both depict the same identifier for two different network devices. Similarly, reference data 112 can be a non-unique identifier for certain other equipment 114, as illustrated by box 404, which both describe in this example the same shelf structure 210, even though referring to different devices within that shelf structure 210. However, referent identifier data 106, which represents a combination of (potentially non-unique) reference data 112 and (potentially non-unique) device data 110 can be unique within referent system 108, as illustrated by box 406. Hence, a precise location of a network device (e.g., network device 100) that does execute or is available to execute a network function (e.g., network function 102) at a particular time can be identified by referent system 108.

Turning back FIG. 1, in some embodiments, network device 100 can determine move data 116. Move data 116 can relate to a move associated with network function 102. In some embodiments, this move (which can be characterized and/or facilitated by move data 116) of network function 102 can relate to transferring execution of network function 102 from network device 100 to another network device (not shown) of the NFV network 101. For example, network device 100 can terminate processes related to the execution of network function 102 and the other device can instantiate processes related to the execution of network function 102. It is understood that when network device 100 off-loads the computing/processing of network function 102 to the other device, the physical location of the computing elements that are executing network function 102 has likely changed. Referent identifier data 106 can be updated to reflect this change. Additionally or alternatively, referent system 108 can be accessed in order to specify or select a suitable physical location or area where network function 102 is to be off-loaded or instantiated, and the execution of network function 102 can be moved to one or more devices at that location or area, as described by referent system 108.

In some embodiments, move data 116 associated with a move of network function 102 can relate to a change in a physical location associated with network device 100. For example, consider a mobile computing platform that collects data relating to weather events that is moved to avoid adverse weather such as a tornado or hurricane. It is appreciated that although the physical device executing network function 102 (e.g., network device 100) has not changed, the actual physical location of that device has changed as a result of the move and these changes can be reflected by an appropriate update to referent identifier data 106 and/or selected or determined in advance of the move based on referent system 108 (e.g., to select where to move the network device).

It is understood that there are many reasons why network function 102 might be moved or why identifying in advance of a move a desirable target (e.g., device or location) for the move. For example, certain network functions might be subject to legal, regulatory, or contractual obligations to be executed within specified geographic boundaries or to be executed at certain local times (e.g., "follow the sun"). As another example, disaster recovery (e.g., weather, political, etc.) events might lead to a move as might capacity management issues, performance management issues, or equipment failure events.

Regardless of the reasons, moving a network function 102 creates difficulties for other reference systems. For example, relying on MAC addresses or the like might provide an ID for the device executing a network function, but says nothing specific as to the actual physical location of that device, particularly after a move. GPS or other location-based services can provide a physical location reference, but require additional equipment for devices and often do not provide location information to the resolution of what might be required for many applications since identifying a city or even a particular building or floor can still be insufficient to readily locate a given network device in many instances. Advantageously, the disclosed referent system 108 can mitigate certain deficiencies of other reference systems and can provide for updating appropriate information in response to changes in the physical location of the device(s) executing network function 102.

Figure 5:
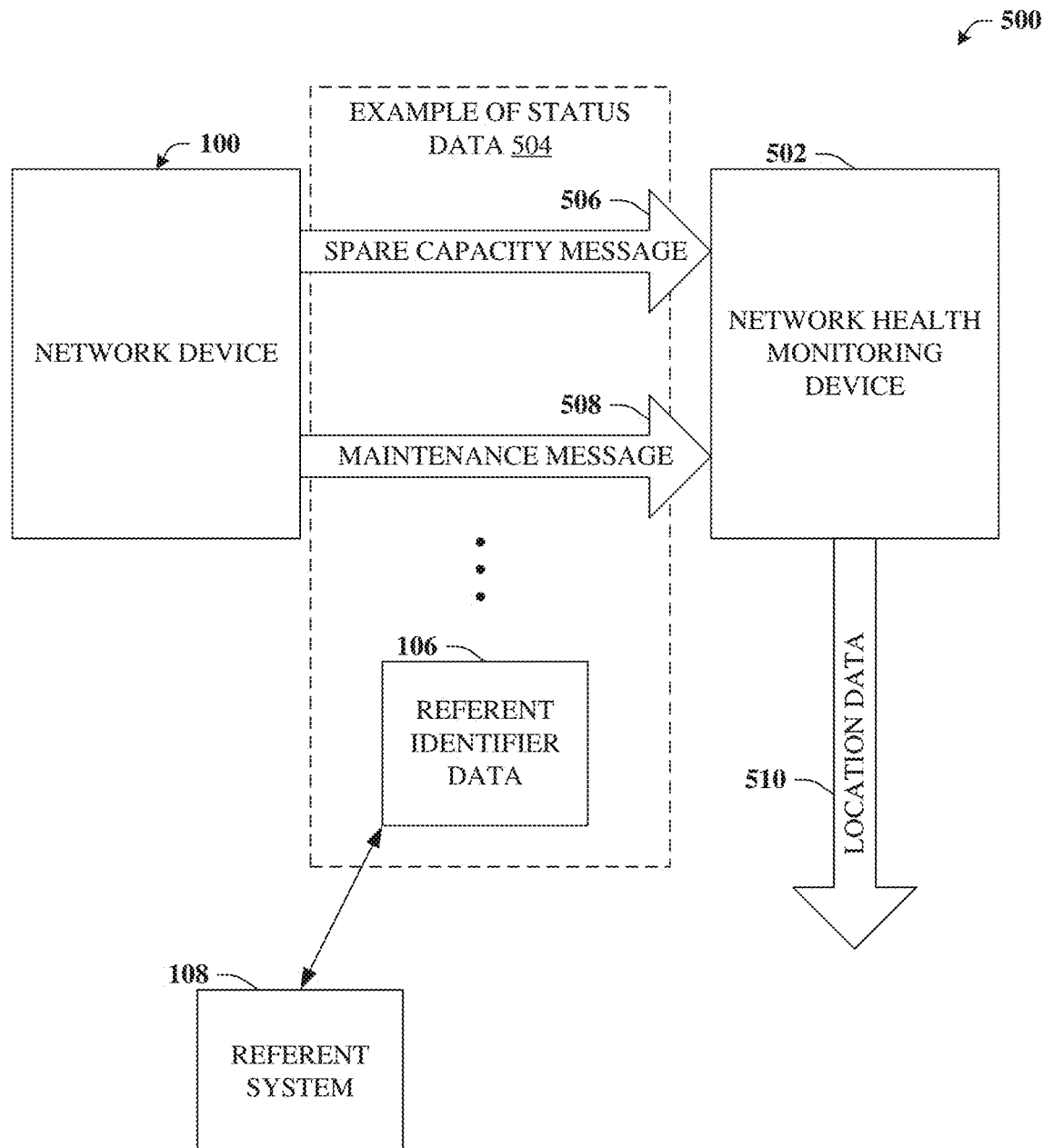
FIG. 5 illustrates a block diagram of an example system that that provides for a network health monitoring device that can leverage the referent system to identify a physical location of the network device in accordance with certain embodiments of this disclosure.

Referring now to FIG. 5, system 500 is illustrated. System 500 provides for a network health monitoring device 502 that can leverage the referent system 108 to identify a physical location of the network device 100. In some embodiments, network health monitoring device 502 can receive status data 504 from network device 100 or from another device or equipment associated with the NFV Network 101. Receipt of status data 504 can be in accordance with push or pull techniques or based on a schedule. Put differently, network device 100 can initiate transmission of status data 504, transmit status data 504 in response to a request (e.g., from network health monitoring device 502), or in accordance with a schedule.

Status data 504 can include referent identifier data 106 as detailed herein. Furthermore, status data 504 can include various status-based data such as, for example, spare capacity message 506 that indicates network device 100 has spare computing capacity, maintenance message 508 that indicates network device 100 requires maintenance, or some other suitable indication of a state or status associated with network device 100. In response to status data 504, network health monitoring device 502 can determine location data 510 indicative of a physical location of network device 100 based on the referent identifier data 106 included in status data 504.

Figure 6:
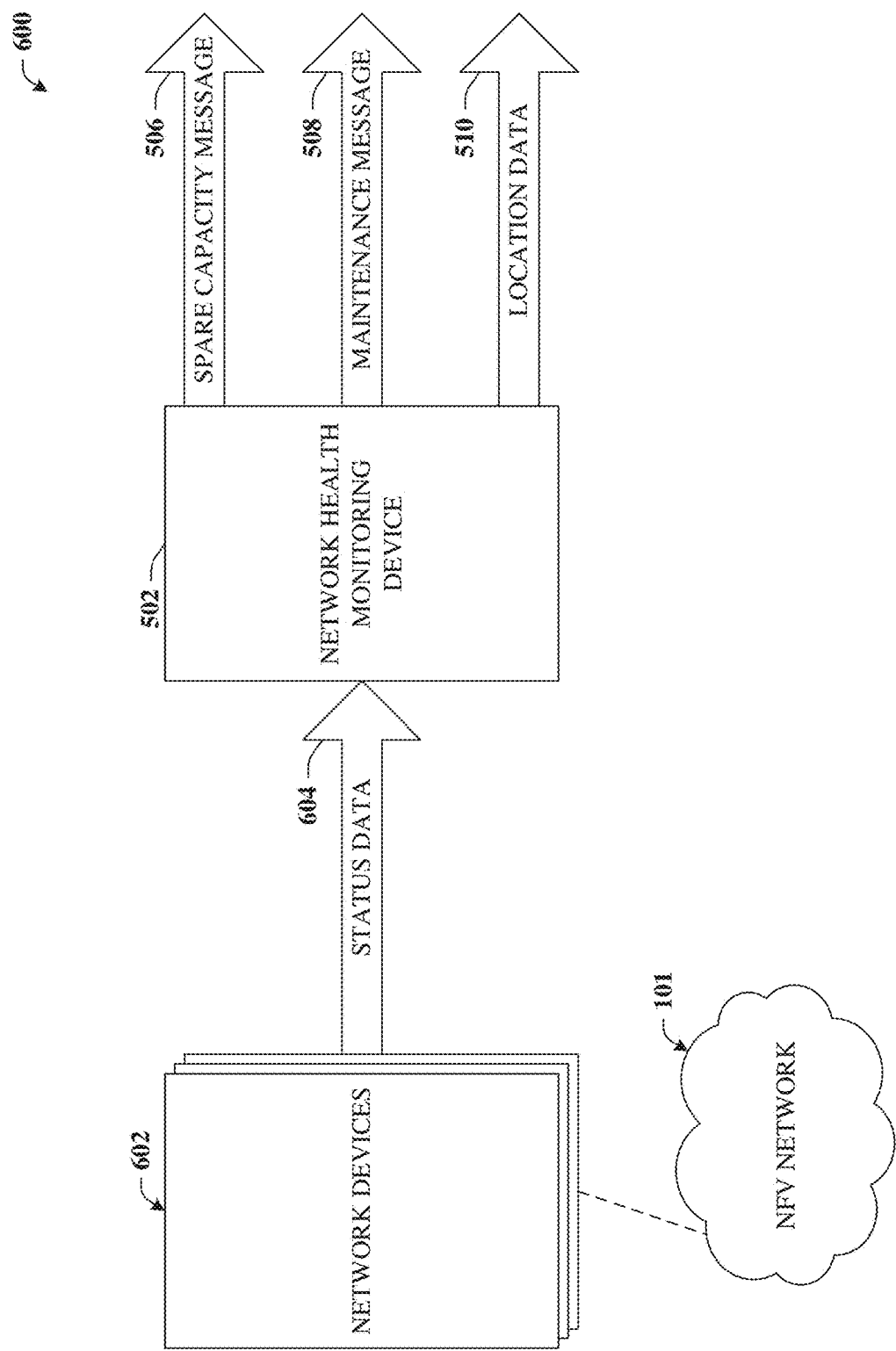
FIG. 6 illustrates a block diagram of an example system that illustrates the network health monitoring device monitoring a group of devices associated with the NFV network and transmitting various indicators in response to status data in accordance with certain embodiments of this disclosure.

Turning now to FIG. 6, system 600 is illustrated. System 600 illustrates the network health monitoring device 502 monitoring a group of devices associated with the NFV network 101 and transmitting various indicators in response to status data. In this example, network devices 602 can represent a group of all or a portion of the devices that provide NFV network 101. The devices of the group of network devices 602 can be substantially similar to network device 100, as described herein, and/or the group of network devices 602 can include network device 100. Likewise, status data 604 represent a group of individual status indicators from all or a portion of the individual network devices 602, any of which can be substantially similar to status data 506 detailed herein. For example, status data 602 can include referent identifier 106 for the associated network device 602 and an associated status indicator.

In response to receiving status data 604, network health monitoring device 502 can transmit location data 510 associated with the particular network device(s) 602 and an appropriate status indicator (e.g., 506, 508, etc.) to other network elements or devices that can facilitate appropriate action in response.

Methods for NFV Architecture Referent System

Figure 7:
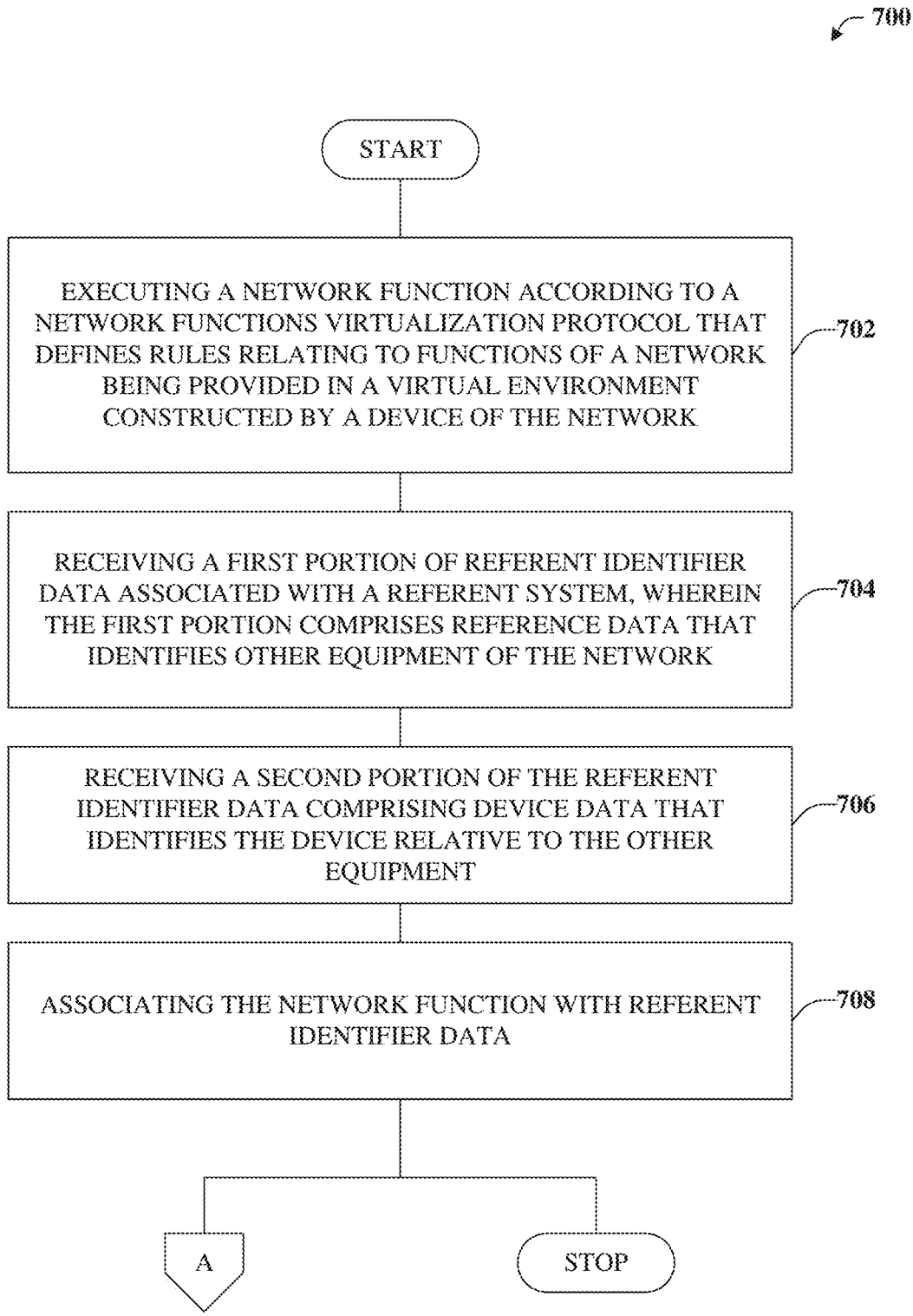
FIG. 7 illustrates an example methodology that can provide for a referent system indicative of a geographical or physical location of devices associated with an NFV Network in accordance with certain embodiments of this disclosure.
Figure 8:
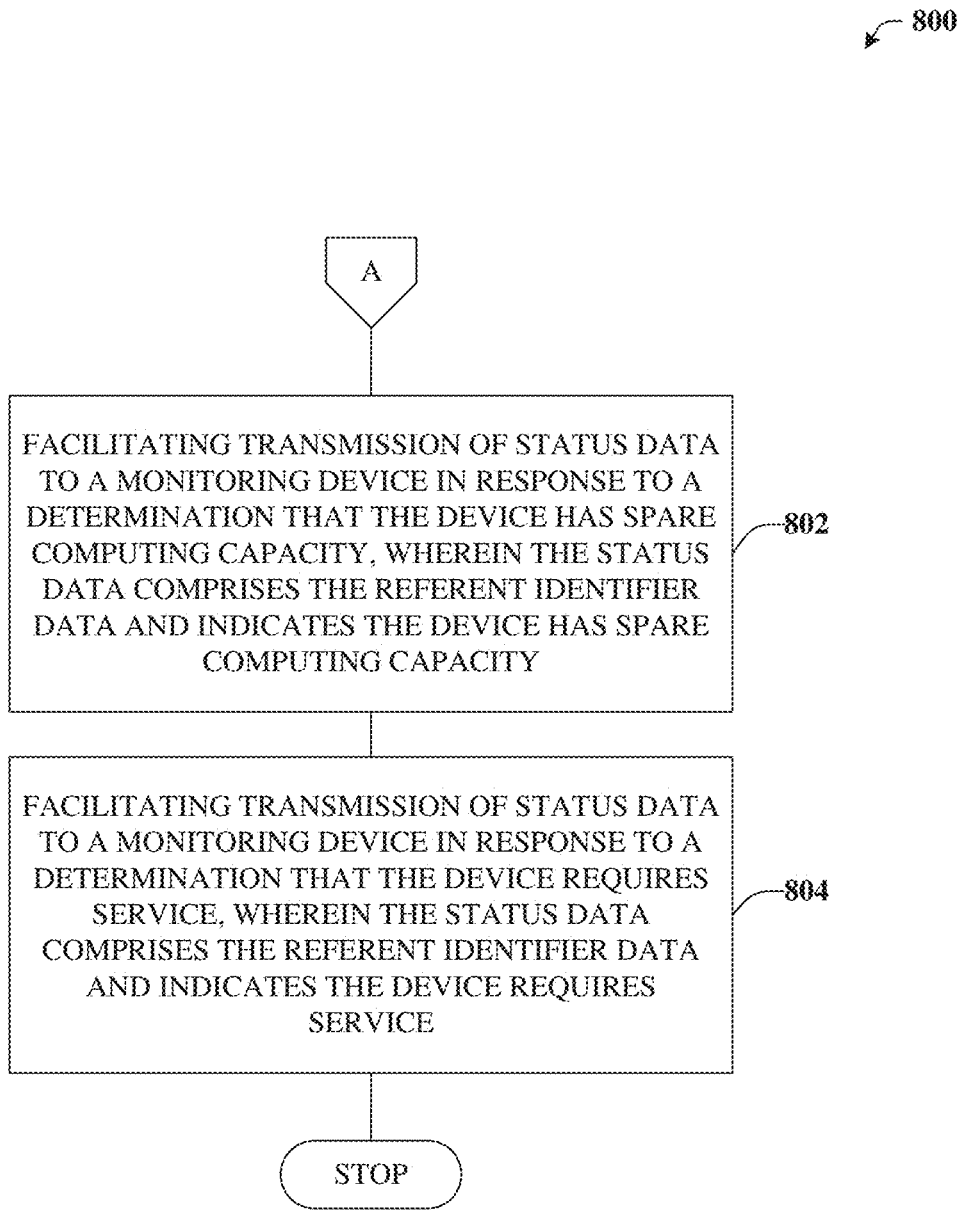
FIG. 8 illustrates an example methodology that can provide for additional features or aspects in connection with providing a referent system for elements of the NFV Network in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can provide for a referent system indicative of a geographical or physical location of devices associated with an NFV Network. For example, at reference numeral 702, a network function can be executed according to a network functions virtualization protocol that defines rules relating to functions of a network being provided in a virtual environment constructed by the device.

At reference numeral 704, a first portion of referent identifier data associated with a referent system can be received. The first portion can comprises reference data that identifies other equipment of the network. At reference numeral 706, a second portion of the referent identifier data can be received. The second portion can comprise device data that identifies the device relative to the other equipment.

At reference numeral 708, the network function can be associated with referent identifier data. Hence, the network function is associated with data that identifies the device that is executing the network function. Such data can, for example, indicate a precise physical location of the device that is executing the network function. Method 700 can proceed to insert A, which is further detailed in connection with FIG. 8, or end.

With reference now to FIG. 8, exemplary method 800 is illustrated. Method 800 can provide for additional features or aspects in connection with providing for a referent system for elements of an NFV Network. For example, at reference numeral 802, transmission of status data can be facilitated. The status data can be transmitted to a monitoring device in response to a determination that the device has spare computing capacity, wherein the status data comprises the referent identifier data associated with the device and indicates the device has spare computing capacity.

At reference numeral 804, transmission of status data can be facilitated. In this example, the status data can be transmitted to a monitoring device in response to a determination that the device requires service, wherein the status data comprises the referent identifier data associated with the device and indicates the device requires service.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from or by a computing device.

As is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disk drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations.

Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
   a processor; and
   a memory that stores executable instructions that, when executed by the processor, facilitate performance of operations, comprising:
   in response to an identified termination of a network function executing on a different device, instantiating the network function on the device, wherein the network function is indicative of a function of a network being provided in a virtual environment; and
   determining that a condition has been satisfied, and in response to the condition being satisfied, updating a value of a location data structure maintained by the network function from a first value representative of a first physical location of the different device to a second value representative of a second physical location of the device, wherein the condition is determined to be satisfied in response to a network function being instantiated on the device, and wherein the value is indicative of a physical location, within a physical structure housing a group of devices, of the device that executes the network function.

2. The device of claim 1, wherein the value of the location data structure is formatted according to a referent system that is indicative of physical locations of devices determined to be executing the network function.

3. The device of claim 2, wherein the value of the location data structure comprises:
   a first portion representative of a device identifier of a processing device executing the network function; and
   a second portion representative of a physical structure identifier of the physical structure in which the processing device is situated.

4. The device of claim 3, wherein the device identifier and the physical structure identifier are, respectively, non-unique identifiers within the referent system.

5. The device of claim 3, wherein the value of the location data structure, representing an aggregation of the device identifier and the physical structure identifier, is a unique identifier of a physical location of the processing device that is currently executing the network function.

6. The device of claim 1, wherein the operations further comprise facilitating transmission of status data to a monitoring device in response to a determination that the device has spare computing capacity, and wherein the status data comprises the value of the location data structure and indicates the device having the second physical location has spare computing capacity.

7. The device of claim 1, wherein the operations further comprise facilitating transmission of status data to a monitoring device in response to a determination that the device requires maintenance, and wherein the status data comprises the value of the location data structure and indicates the device having the second physical location requires maintenance.

8. The device of claim 1, wherein the operations further comprise receiving constraint data indicative of a constraint on a target physical location of a processing device that is employed to execute the network function.

9. The device of claim 8, wherein the operations further comprise facilitating termination of the network function executing on the different device in response to determining that the first physical location does not satisfy the constraint on the target physical location.

10. The device of claim 8, wherein the operations further comprise performing a selection procedure that identifies the device as satisfying the constraint on the target physical location.

11. A non-transitory machine-readable medium, comprising executable instructions that, when executed by a processor, facilitate performance of operations, comprising, comprising:
    in response to an identified termination of a network function executing on a first device, instantiating the network function on a second device, wherein the network function is a function associated with a network being provided in a virtual environment; and
    in response to instantiating the network function on the second device, updating a value of a location data structure maintained by the network function from a first value representative of a first physical location of the first device to a second value representative of a second physical location of the second device, wherein the value is indicative of a physical location of the device that executes the network function within a physical structure housing a group of devices comprising the device.

12. The non-transitory machine-readable medium of claim 11, wherein the value of the location data structure is formatted according to a referent system that is indicative of physical locations of devices determined to be executing the network function.

13. The non-transitory machine-readable medium of claim 12, wherein the value of the location data structure comprises:
a first data portion representative of a device identifier of a processing device executing the network function; and
a second data portion representative of a physical structure identifier of the physical structure in which the processing device is situated.

14. The non-transitory machine-readable medium of claim 13, wherein the device identifier and the physical structure identifier are, respectively, non-unique identifiers within the referent system.

15. The non-transitory machine-readable medium of claim 13, wherein the value of the location data structure, representing an aggregation of the device identifier and the physical structure identifier, is a unique identifier of a physical location of the processing device that is currently executing the network function.

16. The non-transitory machine-readable medium of claim 13, wherein the operations further comprise facilitating transmission of status data to a monitoring device in response to a determination that the device requires maintenance, and wherein the status data comprises the value of the location data structure and indicates the second device having the second physical location requires maintenance.

17. A method, comprising:
in response to an identified termination of a network function executing on a first device, instantiating, by a second device comprising a processor, the network function on the second device, wherein the network function is provided in a virtual environment;
in response to instantiating the network function on the second device, updating, by the second device, a value of a location data structure maintained by the network function from a first value representative of a first physical location of the first device to a second value representative of a second physical location of the second device, wherein the second physical location is indicative of a physical location, within a physical structure housing a group of devices, of the device that executes the network function.

18. The method of claim 17, wherein the operations further comprise, receiving, by the second device, constraint data indicative of a constraint on a target physical location of a processing device that is employed to execute the network function.

19. The method of claim 18, wherein the operations further comprise, facilitating, by the second device, termination of the network function executing on the first device in response to determining that the first physical location does not satisfy the constraint on the target physical location.

20. The method of claim 18, wherein the operations further comprise performing, by the second device, a selection procedure that identifies the second device as satisfying the constraint on the target physical location.

* * * * *